United States Patent [19]

Sweet

[11] Patent Number: 5,270,800
[45] Date of Patent: Dec. 14, 1993

[54] SUBLIMINAL MESSAGE GENERATOR

[76] Inventor: Robert L. Sweet, 2385 Valleyview, Troy, Mich. 48098

[21] Appl. No.: 574,432

[22] Filed: Aug. 28, 1990

[51] Int. Cl.[5] .......................... H04N 7/08; H04N 5/40
[52] U.S. Cl. ...................................... 358/22; 358/142; 358/183
[58] Field of Search ............................... 358/141–142, 358/188, 183, 22

[56] References Cited

U.S. PATENT DOCUMENTS

| | | | |
|---|---|---|---|
| 3,278,676 | 10/1966 | Becker | 358/142 |
| 4,279,088 | 7/1981 | Hyre | 40/442 |
| 4,616,261 | 10/1986 | Crawford et al. | 358/181 |
| 4,692,118 | 9/1987 | Mould | 434/236 |
| 4,733,301 | 3/1988 | Wright | 358/181 |
| 4,734,037 | 3/1988 | McClure | 434/236 |
| 4,777,529 | 10/1988 | Schutz et al. | |
| 4,897,726 | 1/1989 | Morton et al. | 358/183 |
| 5,017,143 | 5/1989 | Backus | 358/183 |
| 5,027,208 | 6/1991 | Dwyer, Jr. et al. | 358/149 |

Primary Examiner—James J. Groody
Assistant Examiner—David E. Harvey
Attorney, Agent, or Firm—Krass & Young

[57] ABSTRACT

A combined subliminal and supraliminal message generator for use with a television receiver permits complete control of subliminal messages and their manner of presentation. A video synchronization detector enables a video display generator to generate a video message signal corresponding to a received alphanumeric text message in synchronism with a received television signal. A video mixer selects either the received video signal or the video message signal for output. The messages produced by the video message generator are user selectable via a keyboard input. A message memory stores a plurality of alphanumeric text messages specified by user commands for use as subliminal messages. This message memory preferably includes a read only memory storing predetermined sets of alphanumeric text messages directed to differing topics. The sets of predetermined alphanumeric text messages preferably include several positive affirmations directed to the left brain and an equal number of positive affirmations directed to the right brain that are alternately presented subliminally. The left brain messages are presented in a linear text mode, while the right brain messages are presented in a three dimensional perspective mode. The user can control the length and spacing of the subliminal presentations to accommodate differing conscious thresholds. Alternative embodiments include a combined cable television converter and subliminal message generator, a combine television receiver and subliminal message generator and a computer capable of presenting subliminal messages.

8 Claims, 8 Drawing Sheets

SUBLIMINAL MESSAGE GENERATOR

TECHNICAL FIELD OF THE INVENTION

The technical field of the present invention is a combination of a subliminal and a supraliminal message generator that utilizes a technology creating three dimensional text. The three dimensional text is geared specifically to the subconscious and more specifically to the right hemisphere of the brain. Linear subliminal text, on the other hand, is specifically geared to the left hemisphere of the brain. For maximizing the results of behavior modification in therapeutic uses, intermittent supraliminal text is included and for use with an ordinary television receiver. This invention maximizes the input of a structured therapy program by allowing the user/clinician to have complete control and knowledge of the specifics within the treatment program.

BACKGROUND OF THE INVENTION

There has been and continues to be an ever increasing interest in improving the quality of our lives through changing our behavior patterns. One of the greatest areas of growth in psychology has been in practices and programs that recognize an individual's attitudes and beliefs as the major contributors to the persons satisfaction with their life. This degree of satisfaction also affects our immediate relationships with family, spouse, children, friends, employers and even casual acquaintances. An area of growing understanding has been the relationship between our conscious and subconscious beliefs and actions. Masses of clinical studies and articles have been published by major universities and private institutions over the last 50 years, as we continually better understand how the conscious and the subconscious interact. Subliminal messages are not consciously perceived yet when effectively done these messages will still have an affect on the person receiving them. Because subliminal messages bypass the conscious thought process they are not easily filtered out or as easily ignored as overt messages. This prevents the user from consciously ignoring the message and promotes the effectiveness of messages. Subliminal messages can be useful in therapeutic programs and even in self-help applications.

A major void in the field of psychology has been the lack of a method to effectively address the subconscious mind and implementing a desired and prescribed treatment program that allows clinical input and monitoring of the treatment of an individual in working on a desired behavior modification. Technologies to date have offered programs that are analogous to an individual going into a shoe store that carries shoes sized 5AAAA to 13EEE and hoping to find a pair they like that fits just by grabbing one off the shelf. One manner of aiding such efforts is by providing a device that gives the user/clinician 100% control over the wording of the actual subliminal messages and the method of delivery to the individual.

The ordinary television receiver is an ideal candidate for presentation of subliminal messages. Most individuals watch television several hours a day. This time can be advantageously employed with therapeutic guidance in an effective method of delivering subliminal (positive affirmation) messages. Unfortunately, there is no manner known in the art for advantageously using the television in an active program of subliminal therapy. Systems known in the art do not permit adaptation of fixed images to be tailored to a particular user. Prior art employs fixed messages that cannot be changed by the user and have a built-in drawback regarding the effectiveness of the message in general. They also create uneasiness in users regarding content of messages which they are unable to observe and control. Video and audio tapes with predetermined subliminal messages are known in the art, yet cannot be made in the variety to meet the needs of all persons. Any therapeutic value of such off-the-shelf preprogrammed audio or visual methodology, at best, can be considered to be only vaguely or remotely effective in producing any type of behavior modification. Additionally, most individuals have concerns about possible subversive content of subliminal messages in mass produced programs, such as those on pre-programmed audio and video cassettes and cartridge applications. This concern is typically unfounded although individuals do not like the though of exposing their minds to a methodology of programming much akin to Orwell's "Big Brother." With this invention complete control rests with the individual and the fiduciary relationship that has developed with his/her therapist.

From a therapy basis, a clinician currently has no concrete method of specifying particular areas for treatment and methodology for implementing a treatment program that utilizes subliminal suggestions. It would thus be useful to provide a manner of presenting user selectable subliminal messages during all uses of the television receiver.

SUMMARY OF THE INVENTION

This invention is a combination of a subliminal message generator that is 100% user programmable for use with a television receiver. The subliminal message generator periodically displays user specified messages for the normal television signal for specific periods of time and duration. This permits an individual to employ a combination of subliminal and supraliminal therapy while watching television. Additionally, with the use of a modem and floppy disk option a therapist can down load both specialized graphic pictures and three dimensional text with just a phone call, thereby foregoing the necessity of an office visit, especially when availability of an appointment may not be immediate.

The subliminal message generator of this invention is constructed as follows. A video synchronization detector receives a video signal and generates a synchronization clock signal in phase and time synchronism with said composite video signal. A radio frequency tuner/demodulator tuned to a television signal generates the video signal in the preferred embodiment. A video display generator generates a video message signal corresponding to a received alphanumeric text or graphic message. This video display generator is connected to the video synchronization detector ensuring the video message signal is in synchronism with the received television signal. A video mixer selectively supplies either the received video signal or the video message signal to an output. The video message signal may be presented either in substitution for the received video signal or mixed with the received video signal. This selected video output preferably drives a radio frequency modulator that produces a television signal for viewing via an ordinary television receiver. A control apparatus connected to the video mixer normally selects the received video signal. At programmable intervals the control apparatus causes the video mixer to select the video message signal for a predetermined subliminal period of time. The messages produced by the video message generator are operator selectable via a keyboard input. The subliminal message generator preferably detects and stores the total time of subliminal therapy for any session. In the preferred embodiment the control apparatus takes the form of a programmed digital computer.

The subliminal message generator of this invention includes a message memory. The message memory stores a plurality of alphanumeric text messages specified by said operator commands for use as subliminal messages. In the preferred embodiment this message memory includes a read only memory storing predetermined sets of alphanumeric text messages directed to differing topics. The control apparatus permits operator selection of one of these sets of messages. This message memory further stores a set of default alphanumeric text messages that is selected by default. Lastly, this message memory includes a read/write memory to store custom messages entered via a keyboard. The user also may edit the messages stored in the read only memory in order to customize them.

The sets of predetermined alphanumeric text messages preferably include several positive affirmations directed to the left brain and an equal number of positive affirmations directed to the right brain. The control apparatus supplies alternate positive affirmations directed to the left brain and positive affirmations directed to the right brain. The video display generator is controllable to generate a video message signal in a linear text mode or in a three dimensional perspective text mode. The left brain directed messages are presented in the linear text mode and the right brain directed messages are presented in the three dimensional perspective text mode.

The subliminal message generator may also include a pictorial element memory for storing therein at least one pictorial element. Such a pictorial element may be included with a message. The pictorial element data may be stored in the read only memory or introduced via a floppy disk. The data for the pictorial element may also come from a picture conversion apparatus. This picture conversion apparatus scans a printed graphic image and converts it into a compressed digital format. This compressed data is stored in the pictorial element memory.

The subliminal message generator includes a manner of control of the color of the subliminal messages. This includes control of the foreground and background colors for the linear text mode and control of the foreground, background and shadow colors for the three dimensional perspective mode.

The control apparatus includes a manner to control the subliminal presentation. The stay time of each subliminal message and the space time between subliminal messages are user controlled. This permits adjustment of the therapy to the individual user's conscious threshold.

The subliminal message generator of this invention can also be used as a supraliminal message generator. The supraliminal message generator operates on the same principle except that the locally generated video signal is selected for a supraliminal interval. The supraliminal messages may be used for conscious reinforcement of the subliminal therapy. This is also useful in video alarms, blocking television reception during predetermined periods and video bulletin boards.

The subliminal message generator of this invention preferably incorporates a computer type structure. An add-on device can be attached to the subliminal message generator to form a completely operable computer. If this computer add-on device includes a modem, then messages and/or pictorial elements may be obtained from a computer bulletin board system accessed via ordinary telephone lines.

An alternative embodiment of this invention is a combined cable television converter and subliminal message generator for use with a television receiver. This combined unit includes a cable television tuner including an input for connection to a cable television source. The cable television tuner can tune a selected cable television signal on the cable television source, and demodulate an audio signal and a composite video signal from said selected cable television signal. The control apparatus preferably controls the tuning of the cable television tuner. The output of this combined unit is via a radio frequency modulator forming a television signal for viewing by an ordinary television receiver.

A further alternative embodiment of this invention is a combined television receiver and subliminal message generator. This combined unit includes a controllable television tune/demodulator for tuning and demodulating a selected channel. The video output selected by the video mixer supplies a video driver circuit driving a cathode ray tube. The audio output of the television tuner/demodulator supplies an audio amplifier for reproduction via a speaker.

A yet further embodiment of this invention presents subliminal messages controllable in the manner described above during computer terminal use. The specifications of the subliminal message presentation remain as described. A memory resident program periodically substitutes the next subliminal message for the normal computer display.

BRIEF DESCRIPTION OF THE DRAWINGS

These and other objects and aspects of the present invention will become clear from the following description of the invention, in which.

DETAILED DESCRIPTION OF THE PREFERRED EMBODIMENTS

This invention is an apparatus used with an ordinary television receiver that produces selectable subliminal messages overlain on the normal picture. This invention permits the normal operation of the television receiver to be employed to present subliminal positive affirmations to the user. These subliminal positive affirmations may be employed in self-help or therapeutic programs.

Figure 1:
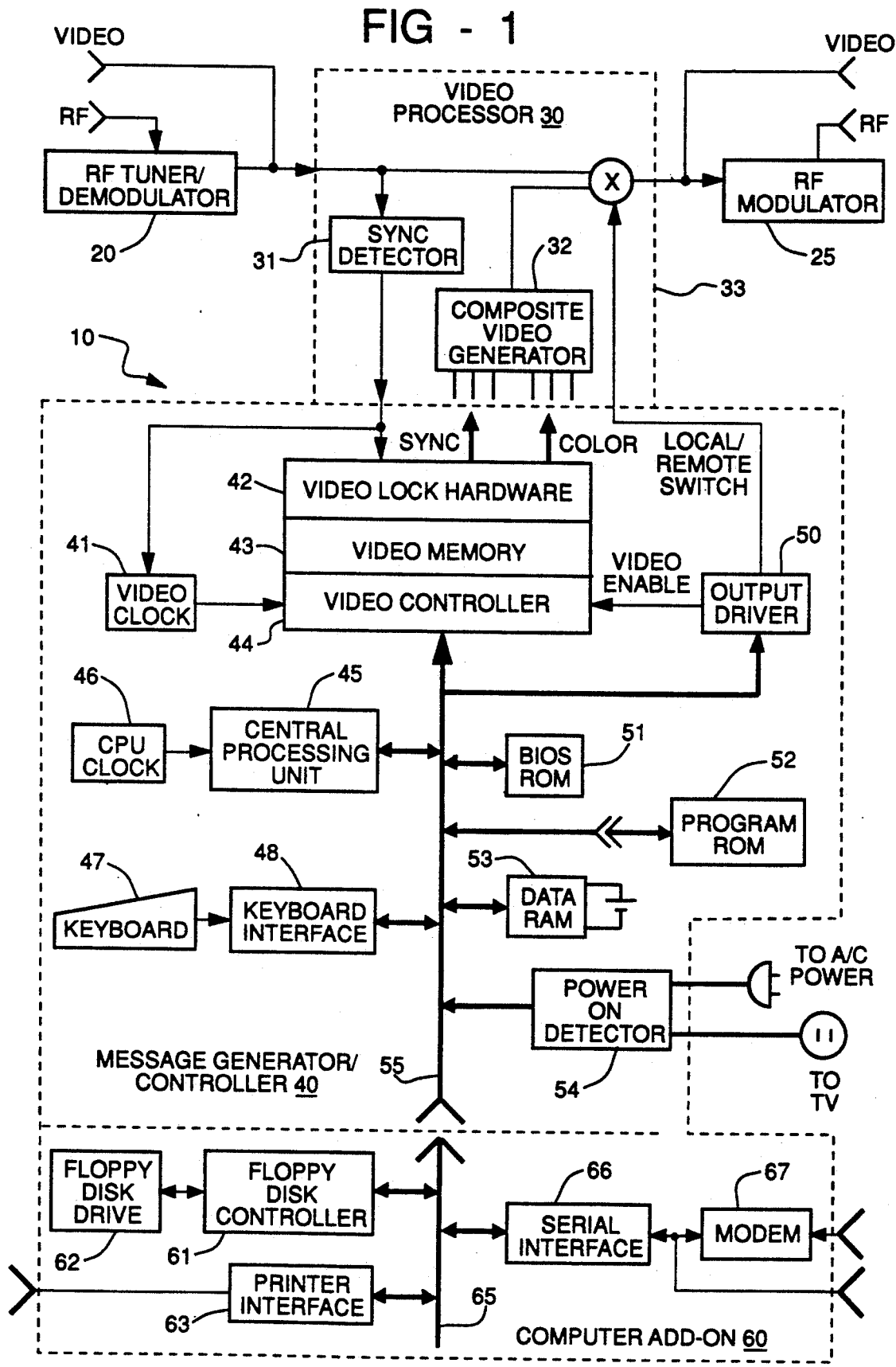
FIG. 1 illustrates in block diagram form the construction of the subliminal message generator of this invention.

FIG. 1 illustrates the construction of the subliminal message generator 10 of this invention. Subliminal message generator 10 permits the normal viewing of a remotely generated television signal. This remote television signal is preferably in one of two forms. The first form is a composite video signal having luminance and chrominance information and a separate audio signal. The second form is a television modulated radio frequency signal of the type ordinarily employed for television broadcast. Subliminal message generator 10 includes radio frequency tuner/demodulator 20 that receives the radio frequency signal.

Radio frequency tuner/demodulator 20 demodulates the composite video signal modulated on the received radio frequency signal. It is common for video cassette recorders, video disk players, cable conversion units, home video games and home computers to employ a television modulated radio frequency signal for coupling to a television receiver. These signals are generally of a fixed frequency corresponding to the broadcast channels 3 or 4. The frequency employed by these source devices is generally selectable to avoid interference with a television broadcast station on the same frequency. Current Federal Communications Commission (FCC) rules prohibit granting broadcast licenses for transmission on both channels 3 and 4 in the same locality. Thus it is always possible to avoid this interference. Radio frequency tuner/demodulator preferably tunes either channel 3 or 4 depending on the frequency used by the source device.

Subliminal message generator 10 operates only on the video signal. The video signal, whether directly received or demodulated by radio frequency tuner/demodulator 20 is supplied to video processor 30. Synchronization detector 31 detects the horizontal and vertical synchronization of the received video signal. This permits subliminal message generator 10 to produce video signals having the same horizontal and vertical phase with the received signal.

Video processor 30 includes a composite video generator 32. Composite video generator 32 generates a local video signal of the same type as the received video signal. Composite video generator 32 produces this local video signal in accordance with received synchronization and color signals. This local video signal produced by composite video generator 32 produces the subliminal message.

Video processor 30 selects the video signal via video mixer 33. Video mixer 33 has a first input coupled to the remote video signal and a second input coupled to composite video generator 32. Video mixer 33 is controlled via a local/remote switch signal to select the remote video signal, the local video signal generated by composite video generator 32 or to mix these two video signals. Normally video mixer 33 selects the remote video signal. At periodic intervals video mixer 33 selects the local video signal or to mix the two video signals. Thereafter video mixer 33 again selects the remote video signal.

In the preferred embodiment video processor 30 is embodied by either a Motorola MC1377 or a Motorola MC1378. These parts are identical except for the capabilities of video mixer 33. In the Motorola MC1377 video mixer 33 cannot mix video signals within a single video interlace half frame. Subliminal message generation can take place by substituting one or more interlace half frames of the video signal from composite video generator 32 for the received signal. In the Motorola MC1378 video mixer 33 includes the capability of mixing the two video signals within a single interlace half frame. This permits the local video signal from composite video generator 32 to be overlain upon the remote video signal. The preferred embodiment of this invention employs the mixing capability of the Motorola MC1378.

Message generator/controller 40 performs the major control functions of subliminal message generator 10. Message generator/controller 40 is constructed in the form of a computer. The various computer components are interconnected via computer bus 55. Message generator/controller 40 includes central processing unit 45. Central processing unit clock 46 controls the timing of the operation of central processing unit 45. In addition, CPU clock 46 provides an indication of the current time. Central processing unit 45 employees this indication of the current time in control of timed operations. Keyboard 47 and keyboard interface 48 provide operator inputs to message generator/controller 40. Message generator/controller 40 includes memory in the form of basic input/output system read only memory 51, plug in program read only memory 52 and data random access memory 53. Note that data random access memory 53 is made nonvolatile by the addition of a backup battery. The television receiver displays the computer output. Message generator/controller 40 includes video clock 41, video controller 42, video memory 43 and video lock hardware 44. Output driver 50 is responsive to commands from central processing unit via bus 55. Output driver 50 generates a video enable signal supplied to video controller 44 and the local/remote switch signal supplied to control video mixer 33. This provides an output for the computer via generation of an appropriate video signal at composite video generator 32 and selection of the local signal at video mixer 33 Power on detector 54 detects the powering on of the accompanying television receiver. Detection of this event is communicated to central processing unit 45 via bus 55.

Message generator/controller 40 operates in accordance with a program stored in program read only memory 52. The program within read only memory 52 causes central processing unit 45 to receive user commands via keyboard interface 48. The program within read only memory 52 causes central processing unit 45 to respond to these user commands to interact with basic input/output system memory 51, data random access memory 53 and video controller 44 to operate in a user selected mode. In the preferred embodiment, the user may select the messages to be presented subliminally, the stay time of these messages and the space time between presentations. The program stored in program read only memory preferably also provides supraliminal viewing functions. These supraliminal viewing functions include an enhancement to the subliminal message mode, an alarm mode, a time blocking mode in which the remote source is unavailable and a bulletin mode. Program read only memory 52 preferably also includes several sets of messages suitable for different self-help topics. These functions will be more particularly described below in conjunction with the flow charts of FIGS. 4A, 4B, 4C and FIGS. 5A and 5B.

Computer add-on 60 is optionally coupled to message generator/controller 40 to form a fully operational general purpose computer. Add-on bus 65 of computer add-on 60 couples to computer bus 55. This permits bidirectional communication between message generator/controller 40 and computer add-on 60. Computer add-on 60 includes a floppy disk controller 61 controlling a floppy disk drive 62. Floppy disk drive 62 preferably employs 1.44 megabyte 3½ inch disks. This serves as a manner for entry of programs and data into the computer. Computer add-on 60 also includes printer interface 63 for driving a standard printer port. Lastly, serial interface 66 drives an external RS232 serial port and 2400 baud modem 67 that is optionally connectable to a telephone line. The computer formed of message generator/controller 40 and computer add-on 60 preferably has the architecture of an IBM PC/XT compatible computer. Central processing unit 45 is thus an Intel 8086 or 8088 microprocessor.

Subliminal message generator 10 does not alter any audio signal modulated on the received radio frequency signal. It is known in the art that television signals include audio modulated on a subcarrier of the primary carrier signal. Radio frequency tuner/demodulator 20 is constructed so that demodulation of the video signal results in the modulated audio subcarrier appearing with the demodulated video signal. This modulated audio subcarrier is not changed by operation of subliminal message generator 10. The altered video signal, including the unaltered modulated audio subcarrier is supplied to radio frequency modulator 25. Radio frequency modulator 25 produces a television modulated radio frequency signal of the same time as that received. This television modulated radio frequency signal includes a video portion altered as described and an unchanged audio portion. It is also feasible for radio frequency tuner/demodulator 20 to completely demodulate the audio signal. In this case this demodulated audio signal can be directly supplied to an amplifier and speaker or supplied to radio frequency modulator 25. If this alternative is employed, radio frequency modulator 25 must modulate the audio signal on the proper subcarrier before modulation on the radio frequency signal for the selected channel 3 or 4.

The subliminal messages presented by subliminal message generator 10 are preferably of positive affirmations of two types. The text of the first type of positive affirmation is directed to the left brain. The text of the second type of positive affirmation is directed to the right brain. In the preferred embodiment left brain directed subliminal messages alternate with right brain subliminal messages on the same topic. This enhances the effectiveness of the self-help or therapeutic program.

Figure 2:
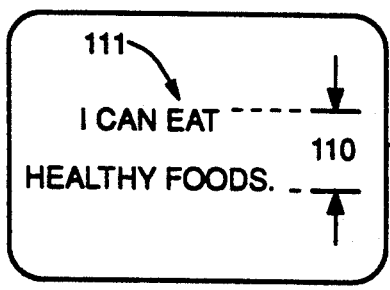
FIG. 2 illustrates an example of a message in linear text mode.

The left brain is believed to be the seat of logical, linear thinking. The text of the subliminal messages directed to the left brain is preferably logical and rational. These left brain directed subliminal messages are presented in a linear block text mode as illustrated in FIG. 2. FIG. 2 illustrates message 111 on television screen 101. This linear block text enables the message to be subliminally perceived by the left brain.

Figure 3A:
FIGS. 3A and 3B illustrate examples of a message in three dimensional perspective mode.
Figure 3B:
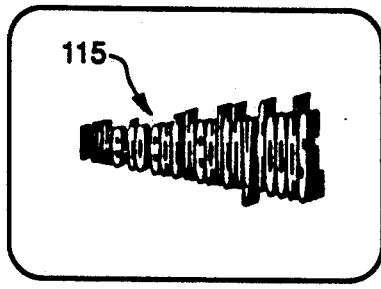

The right brain is believed to be the seat of feelings, emotions and artistic, creative, nonlinear spatial and perspective oriented thinking. The text of the subliminal messages directed to the right brain is preferably based upon communications in a language that it understands and impacts our emotional and feeling natures. This text is preferably presented in a three dimensional perspective mode as illustrated in FIGS. 3A and 3B. FIG. 3A shows a going out mode in which the perspective text appears to getting farther from the viewer from left to right. FIG. 3B shows the opposite going in mode. Video controller 44 preferably includes the capacity to generate displays in either of these three dimensional perspective modes from text character data. In either case the text is presented in a manner enabling the message to be subliminally perceived by the right brain.

Figure 4A:
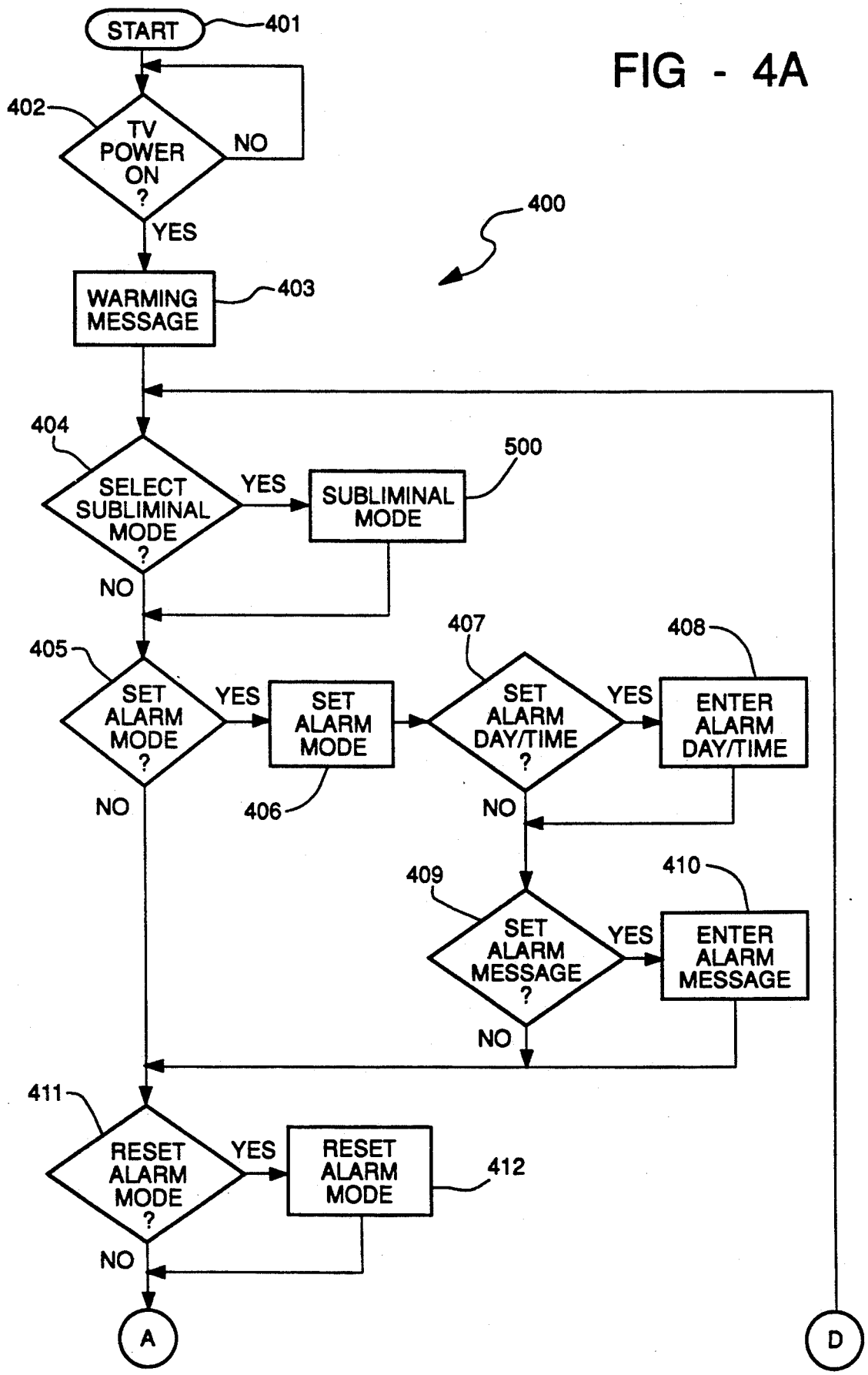
FIGS. 4A, 4B and 4C illustrate in flow chart form a program for control of the subliminal message generator of this invention.
Figure 4B:
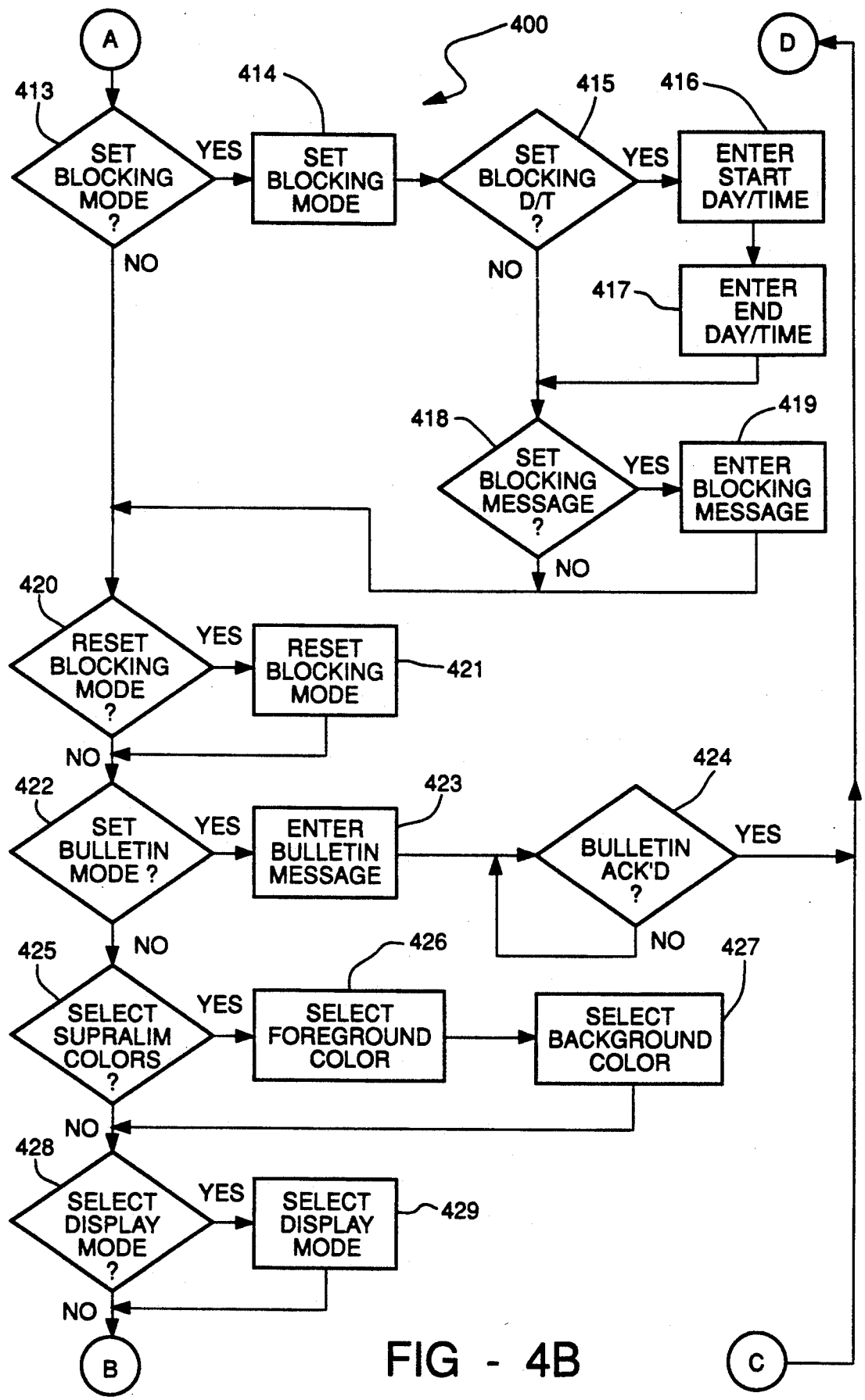
Figure 4C:
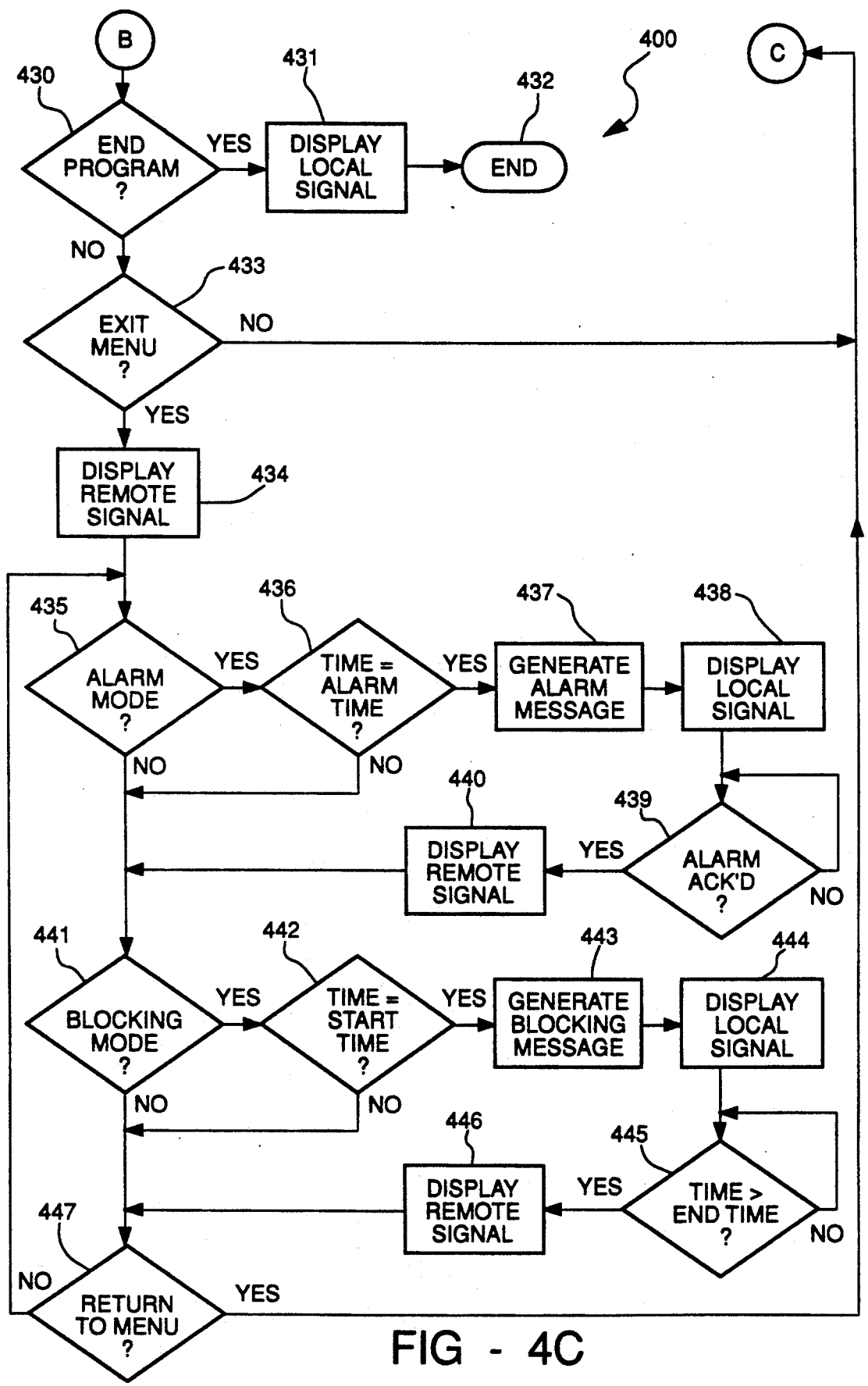
Figure 5A:
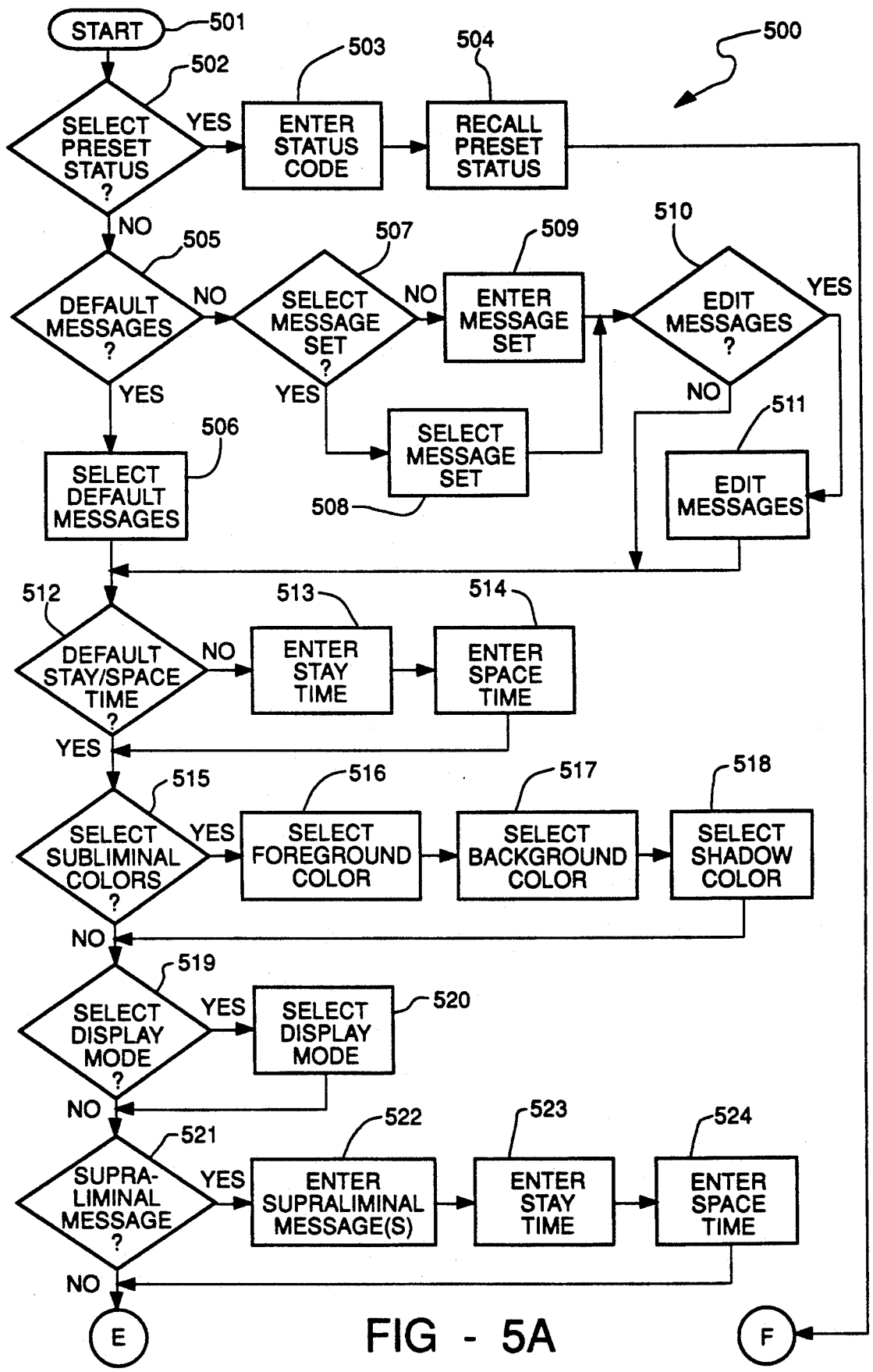
FIGS. 5A and 5B illustrate in flow chart form a program for control of the subliminal mode of this invention.
Figure 5B:
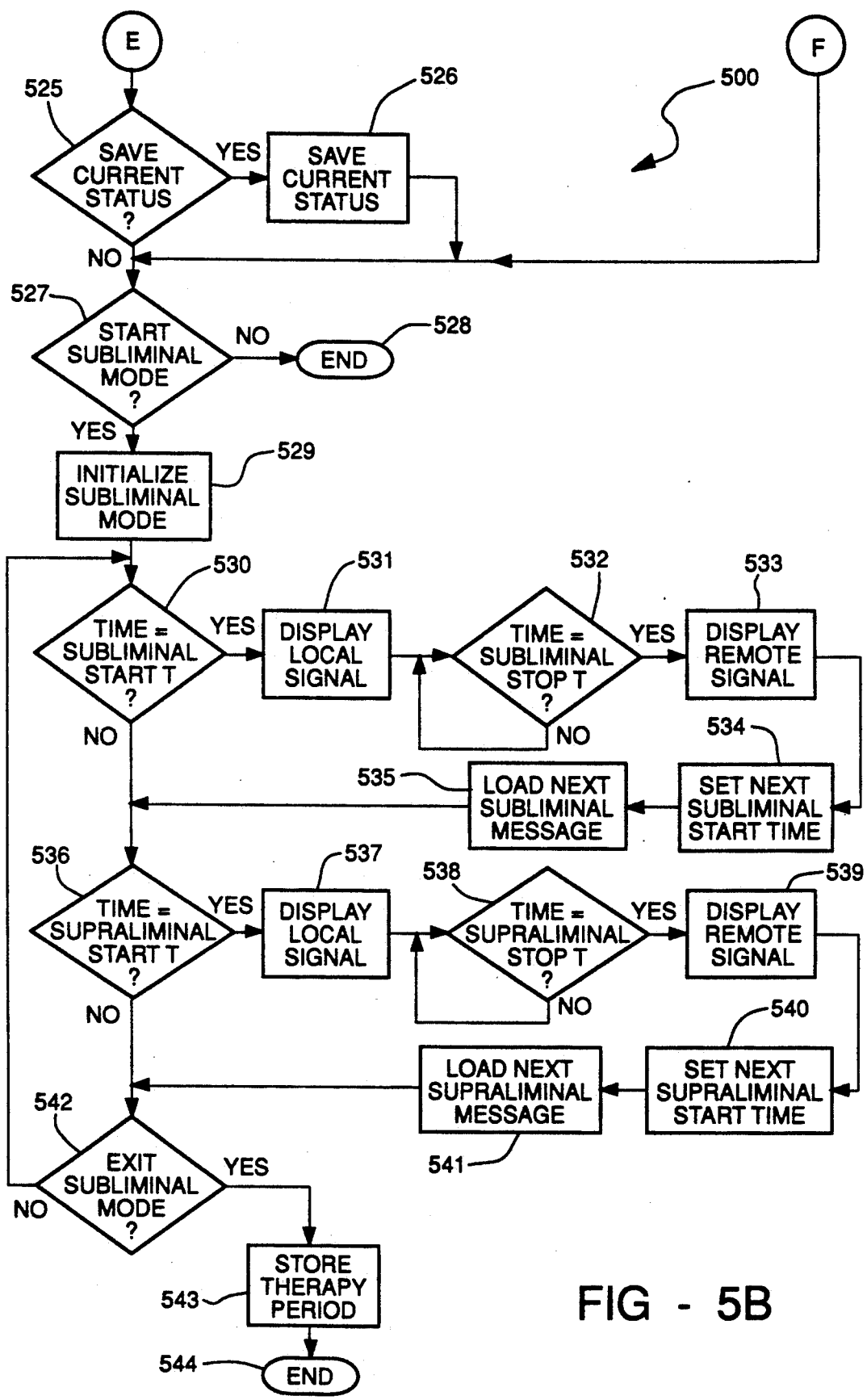

The manner of operation of subliminal message generator 10 will now be described in conjunction with flow charts illustrated in FIGS. 4A, 4B, 4C and FIGS. 5A and 5B. FIGS. 4A, 4B and 4C illustrate a flow chart of program 400 used to control the operation of central processing unit 45 in this invention. FIGS. 5A and 5B illustrate a flow chart of subroutine 500 used to control the operation of central processing unit 45 to produce the subliminal messages of this invention. Program 400 illustrated in FIGS. 4A, 4B and 4C and subroutine 500 illustrated in FIGS. 5A and 5B are not intended to show the exact details of the program for control of central processing unit 45. Instead, these flow charts illustrate only the general steps employed in this program. Those skilled in the art of computer programming would be enabled to provide the exact details of the program for control of central processing unit 45 from program 400 and subroutine 500 illustrated here and the other descriptions of the present application.

Program 400 begins at start block 401 (FIG. 4A). Program 400 first tests to determine if the television is powered on (decision block 402). Message generator/controller 40 includes power on detector 54. Power on detector 54 is connected to the AC power source via a standard plug. Power on detector 54 includes a standard power receptacle for powering the accompanying television receiver. Power on detector 54 detects the flow of current from the AC power source to the television receiver when the television receiver is turned on. Power on detector 54 is coupled to bus 55 for communication of the power on condition to central processing unit 45. In the case that the television receiver is not powered on, decision block 402 repeats until the television is powered on. The television receiver functions as the output device of message generator/controller 40. This prevents message generator/controller 40 from entering an unknown state when the operator has no indication of its operation.

Program 400 next displays a warning message (processing block 403). This warning message is presented by video controller 44 interacting with central processing unit 45 and program read only memory 52 to store data in video memory 43 corresponding to this warning. Video lock hardware 41 produces synchronization and color signals corresponding to this data. Output driver 50 under control of central processing unit 45 enables video controller 44. Output driver 50 further controls video mixer 33 so that this warning messages overrides the remote video signal. In this case, video mixer 33 preferably substitutes the local signal for the remotely generated signal. The warning message indicates that the subliminal message generator will be in operation.

This permits users who do not want to be subject to the subliminal messages to disable this feature. This is useful in households where some but not all the members want to use subliminal messages.

Program 400 next gives the user a number of mode choices. Program 400 illustrates this set of choices as a number of yes/no decisions, however, a single screen with menu choices is preferred. Subliminal message generator 10 produces this menu screen in the same manner as previously described in conjunction with the warning message. The preferable mode choices include the subliminal mode, an alarm mode, a blocking mode and a bulletin mode. If the user selects the subliminal mode (decision block 404) then program 400 enters the subliminal mode subroutine 500. This subliminal mode subroutine 500 will be described in conjunction with FIGS. 5A and 5B.

The user may set or reset the alarm mode. When set the alarm mode interrupts the remote signal of the television receiver and displays an alarm message at a future day and time. This alarm message is produced by video controller 44 in the manner previously described. When the alarm is tripped, video mixer 33 selects the local signal until the alarm is acknowledged. This preferably includes substitution of the locally generated signal for the remotely generated signal. If the user decides to set the alarm mode (decision block 405), then the alarm is set (processing block 406). If selected (decision block 407), the user can set the alarm day and time (processing block 408). The prior alarm day and time are used unless changed. If selected (decision block 409), the user can enter an alarm message (processing block 410). The prior alarm message is used unless it is changed. If selected (decision block 411), the alarm is reset (processing block 412). When reset, the alarm does not interrupt the remote video signal even at the alarm day and time.

Referring now to FIG. 4B, the user may set or reset the blocking mode. When set the blocking mode interrupts the remote video signal of the television receiver for the interval between its start day and time and end day and time. During this interval subliminal message generator 10 displays a blocking message produced in the manner previously described. This is useful, for example, to display the message "Do your homework." during hours that the children are not permitted to watch television or "Take your medication now." for an elderly person. Because this blocking message is intended to prevent viewing of remote television signals, the locally generated signal is preferably substituted for the remotely generated signal. If the user decides to set the blocking mode (decision block 413), then the blocking mode is set (processing block 414). If selected (decision block 415), the user can set the blocking mode start day and time and the blocking mode end day and time (processing blocks 416 and 417). If selected (decision block 418), the user may also enter a new blocking message (processing block 419). If selected (decision block 419), the blocking mode may be reset (processing block 421). When reset, the blocking mode does not interrupt the remote signal.

The final mode is the bulletin mode. In the bulletin mode one person may post a message for others that will remain until acknowledged. This feature is useful in busy families that have differing schedules. Any member of the family turning on the television receiver will see the bulletin. As in the alarm mode and the blocking mode, the locally generated signal preferably substitutes for the remotely generated signal. If selected (decision block 422), the user is permitted to enter a bulletin message (processing block 423). This bulletin message is displayed via the television receiver in the manner previously described. The bulletin message continues to be displayed until acknowledged, preferably by a keyboard entry. Once acknowledged (decision block 424), the bulletin message is replaced by the menu and control returns to decision block 404.

The user may specify the colors of the supraliminal display. These colors are employed in display of the main menu, the alarm message, the blocking message and the bulletin message. If selected (decision block 425), the user may select the foreground color (processing block 426) and the background color (processing block 427). The selected background color only appears in the signal substitution mode. When operating in the signal mixing mode, a transparent background is assumed. That is the remotely generated signal is seen during the background portions of the locally generated signal.

The user may select the supraliminal display modes. As previously described, video processor 30 preferably permits both substitution of the locally generated signal for the remotely generated signal and mixing of these signals. The preferred mode for the supraliminal messages is the substitution mode. If selected (decision block 428), the user may set the subliminal message mode (processing block 429).

Referring now to FIG. 4C, the user is permitted to end the program from the menu. This is useful when using computer add-on 60. By ending the program stored in program read only memory 52, the computer can be used for other purposes. If selected (decision block 430), video processor 30 substitutes the local signal for the remote signal (processing block 431) and the program is exited via end block 432. This permits message generator/controller 40 to be employed as a computer using the screen of the television receiver as the video display.

The user may end the menu. This permits use of the television in the alarm or blocking modes. If selected (decision block 433), video mixer 33 selects the remote video signal (processing block 434). Otherwise control returns to decision block 404 at the beginning of the menu.

Program 400 then enters a checking loop. This loop repeatedly checks the current time from CPU clock 46 according to the current mode. If the alarm mode is set (decision block 435), program 400 checks to determine if the alarm day and time have been reached (decision block 436). If not, then the loop continues. If so, then video controller 44 generates the alarm message (processing block 437) and video mixer 33 selects the local video signal (processing block 438). The alarm message remains on the television screen until acknowledged (decision block 439). The user preferably acknowledges the alarm by some input on keyboard 47. When acknowledged, the alarm message is no longer displayed. Video mixer 33 selects the remote video signal (processing block 440). Program 400 then continues the checking loop.

Program 400 also checks the blocking mode. If the blocking mode is set (decision block 441), program 400 checks to determine if the blocking start time has been reached (decision block 442). If not, then the loop continues. If so, then video controller 44 generates the blocking messages (processing block 443) and video mixer 33 selects the local video signal (processing block 444). The blocking message remains on the screen until the blocking end time is reached (decision block 445). This end time covers the interval to be blocked. The blocking message is no longer displayed upon reaching the end time. Video mixer 33 selects the remote video signal (processing block 446). Program 400 then continues the checking loop.

The user may call up the menu. Depression of a particular key on keyboard 47 preferably returns the menu screen. If selected (decision block 447), program 400 returns to decision block 404 and repeats the menu selections. Otherwise control returns to decision block 435 to continue testing for an active alarm or blocking mode.

FIGS. 5A and 5B illustrate subroutine 500. Subroutine 500 implements the subliminal message function of this invention. Subroutine 500 is selected by decision block 404 of program 400. Subroutine 500 begins at start block 501.

Subroutine 500 first tests to determine if the user desires to use a stored preset status file (decision block 502). As will be explained below, the user may select a set of variables such as: a predetermined message set, or user entered message set; a specified stay time and space time: foreground, background and shadow colors; and the parameters of the optional associated supraliminal message if selected. A stored preset status may be recalled by entry of a corresponding status code (processing block 503). The status code is preferably a set of letters and/or numbers identifying the particular preset status. Upon entry of the status code, the corresponding preset status file is recalled (processing block 504). This automatically sets are the parameters needed for the subliminal mode. Control of subroutine 500 then skips forward to begin the subliminal mode. This feature will be further described below.

Subroutine 500 then tests to determine if the user desires the default subliminal messages (decision block 505). If so, then the default message set is selected (processing block 506) for use. Program read only memory 52 includes the default subliminal message set. This default subliminal message set preferably includes 12 left brain directed messages and 12 right brain directed messages. These default subliminal messages preferably relate to general self esteem. Selection of these default subliminal messages permits rapid selection of a set of subliminal messages.

The user may select a predetermined set of subliminal messages other than the default set (decision block 507). Program read only memory 52 preferably stores several sets of subliminal messages directed to various topics. These topics preferably include the most popular areas of desired self improvement. Table 1 includes a list of the preferred topics. Each topic preferably includes twelve affirmations for the left brain and twelve affirmations for the right brain.

TABLE 1

| PREFERRED TOPICS |
| --- |
| Quit Smoking |
| Increase Self Esteem |
| Freedom from Pain |
| Increasing Concentration |
| Developing Positive Character Traits |
| Attracting Prosperity |
| Weight Loss and Obsession |
| Managing Time and |

TABLE 1-continued

| PREFERRED TOPICS |
| --- |
| Eliminating Procrastination |
| Enhancing Energy |
| Reduce Sleep Problems |
| Stress Reduction |
| Home Safety for Kids |
| Study Skills |
| Sexual Confidence |
| Reinforcing Spiritual Convictions |
| Life with Serendipity |
| Creating Positive Relationships |
| Overcoming Codependancy |
| Believing in Miracles |
| Releasing the Healing Power within |
| Controlling Anger and Negative Emotions |
| Release from Emotional Addictions |
| Improving Creativity |
| Improving Athletic Performance |
| Getting Self Disciplined |
| Setting and Achieving Goals |
| Freedom from the Past Through Forgiveness |
| Improving Selling Skills |
| Focus on Better Parenting |
| Drug/Chemical Addictions |
| Principles/Laws of Success |
| Alcoholism and Releasing Shame |
| Bringing the Family Together |
| Conquering Rejection and Compulsion |
| Speaking to the Child Within |

Table 2 lists an example of twelve left brain directed messages on quitting smoking. These left brain directed messages are based on influencing rational, linear thought.

TABLE 2

| LEFT BRAIN MESSAGES |
| --- |
| 1. I believe I can stop smoking. |
| 2. I am willing to give up smoking. |
| 3. I am ready to stop smoking. |
| 4. I am able to stop smoking. |
| 5. Smoke free is for me. |
| 6. I give myself permission to stop smoking. |
| 7. I am determined to stop smoking. |
| 8. It's easy to stop smoking. |
| 9. I see myself as a non-smoker. |
| 10. I have control over my habits. |
| 11. I feel better about myself. |
| 12. I have control over my mind and emotions. |

Table 3 similarly lists twelve right brain directed messages on this same topic. These right brain directed messages are based on effecting feelings and emotions. The user may select one of these topics (decision block 508) and its corresponding set of left and right brain directed messages.

TABLE 3

| RIGHT BRAIN MESSAGES |
| --- |
| 1. I am anxious to stop smoking. |
| 2. Quitting is painless and natural. |
| 3. I am free of the bonds of smoking. |
| 4. I am a non-smoker. |

TABLE 3-continued
RIGHT BRAIN MESSAGES

5. I have decided to stop smoking.
6. I have no need for cigarettes.
7. I am smoke free.
8. I deserve to be smoke free.
9. I visualize my life full and complete without cigarettes.
10. I quit now.
11. I'm smart to stop smoking.
12. The power within me supports my decision.

In the preferred embodiment program read only memory 52 is a plug-in memory as illustrated in FIG. 1. Preferably differing versions of plug-in program read only memory 52 are available. Each version of plug-in program read only memory 52 includes a collection of message sets. Thus the user may select the plug-in program read only memory 52 including the message set relevant to that user's needs.

The user may also enter a custom message set. If the user does not select the default message set (decision block 505) or one of the collection of message sets stored in program read only memory 52 (decision block 507), the user may enter a custom message set (processing block 509). The user employs keyboard 47 to specify this custom message set. This custom message set preferably includes 24 messages in the same manner as the predetermined message sets. Once entered the custom message set is stored in data random access memory 53. These custom message sets remain even if subliminal message generator 10 is turned off because of the backup battery. If the subliminal message generator is equipped with computer add-on 60, then the custom message sets may be stored on a floppy disk using floppy disk drive 62. Additional message sets and pictorial elements, can be obtained via modem 67 by accessing a computer bulletin board in a manner known in the art. In the preferred embodiment subliminal message generator 10 permits entry and storage of several such custom message sets.

Subroutine 500 next permits the user to edit the message set. If selected (decision block 510), the user can edit each message of the selected message set (processing block 511) even a user entered message set. This editing process permits the user to make insertions, deletions and substitutions in the current message set. In the preferred embodiment, the user may specify either the linear text mode or the three dimensional perspective mode of presentation for each of the messages edited. The preferred embodiment permits integration of graphics with the edited text. A set of graphic elements in the form of computer clip art may be stored in plug-in program read only memory 52 or on a floppy disk introduced into floppy disk drive 62. The user can integrate these graphic elements with the edited text to form a combined text and graphic message for subliminal presentation. The user may also designate a priority message that will be presented more frequently that the other messages. This more frequent presentation is further described below.

This editing process permits the user to customize a message set to his current needs. Each such edited message set is stored in data random access memory 53. These edited message sets become custom message sets permitting selection from decision block 504 in the manner to be described further below.

The user may then accept or reject the default stay time and space time for the subliminal messages (decision block 512). The stay time is the length of time the subliminal messages are present in the screen of the television receiver. The default stay time is preferably 1/60th of a second, the time of one interlace scan of the television screen. If user rejects the default times (decision block 512), then the user may enter the stay time (processing block 513). This user entered stay time is preferably limited to the range between 1/180th of a second to 1/10th of a second. A stay time of less than the duration of one interlace frame is achieved using less than the whole screen. FIG. 2 illustrates message 111 having a height 110. The ratio of the height 110 to the entire screen height is the proportion of one interlace scan including the subliminal message 111. This reduction in height reduces the perceptibility of the message. The user next enters the space time for the subliminal messages (decision block 514). The space time is the length of time between presentation of successive subliminal messages. The default space time is preferably 3 seconds. If the user rejects the default times (decision block 512), the user may enter the space time that is preferably limited to the range between ⅛ of a second to 15 seconds. These adjustments customize the presentation to the particular conscious threshold of the individual user.

The user may then enter the colors used in the subliminal display. If selected (decision block 515), the user enters the foreground color (processing block 516), the background color (processing block 517) and the shadow color (processing block 518). The foreground and background colors are the same as previously described with regard to the colors in supraliminal messages. As for supraliminal messages, the background color is only shown upon display by substitution. In a mixing display, the background is transparent. The shadow color is the color of the "shadow" appearing in text in the three dimensional perspective mode. This shadow portion of the text appears in both the substitution and the mixing display modes.

The user may next specify the display mode. If selected (decision block 519), the user may select the display mode (processing block 520). As previously described the subliminal text is preferably either substituted for the remote video signal or mixed with the remote video signal. The default is to mix subliminal messages with the remote video signal.

Subroutine 500 next checks to determine if the user desires to implement an optional supraliminal message. The user may select to display a consciously perceivable message that may reinforce the effect of the subliminal messages or may be directed to a different topic. Because this message or these messages are consciously perceivable, they are subject to conscious acceptance or rejection. Therefore the message or messages selected should reinforce a conscious decision of the user. If selected (decision block 521), the user then specifies the message or messages (processing block 522). The user then selects the stay time preferably between one to fifteen seconds (processing block 523). Next the user selects the space time preferably between one to thirty minutes.

Referring now to FIG. 5B, the user may store the currently selected options status. If selected (decision block 525), the currently selected option status is saved (processing block 526). The current status is stored in data random access memory 53. Data random access memory 53 is continuously powered by continuously powering subliminal message generator 10 or by the battery in a manner known in the art. It the event that the unit includes computer add-on 60, then the current status may also be stored on a floppy disk within floppy disk drive 62. This serves a permanent record of the current user selections. Each such stored status set is given a status code. This permits recall of the preset status by entry of the status code. This process operates as described in conjunction with blocks 502, 503 and 504 (FIG. 5A).

The capability of storing a selected status set is useful when several users will use the same subliminal message generator 10. This is particularly useful in a clinical setting. A professional therapist would select the subliminal message parameters appropriate for a particular user. These parameters would be stored as a preset status set. At the beginning of a therapy session either the user or the therapist would select the corresponding preset status set. This would be recalled and used in control of the therapy session. Thereafter the user can watch broadcast television or a video tape while viewing the subliminal messages selected by the therapist. Thus several users may employ subliminal message generator 10 with custom message sets and particular display parameters without re-entering them for every use.

After setting the parameters of the subliminal mode, the user may start the generation of subliminal messages (decision block 527). If the user rejects presentation of subliminal messages, subroutine 500 is exited via end block 528. This executes a return to the original menu of program 400 at decision block 404. Otherwise presentation of the subliminal messages begins.

Presentation of subliminal messages involves timing of several video operations. The subliminal message process is initialized (processing block 529). This includes setting the initial start times and messages to be presented. This also includes capturing the current time. This time at the start of the subliminal message therapy will be used latter to computer the total therapy time. Timing takes place under the control of central processing unit 45 referring to the time indicated by central processing unit clock 46. The initial messages are loaded into video memory 43. These initial messages include the initial subliminal message and the initial supraliminal message, if the user selects supraliminal messages. Video controller 44 stores data in video memory 43 corresponding to these messages. The initial start times for the subliminal and supraliminal messages are set equal to the current time plus the corresponding space time.

Subroutine 500 enters a loop for control of message display. Subroutine 500 first determines if the current time equals the subliminal message start time (decision block 530). If this is not the case, then no subliminal message is presented. If this is the case, then video mixer 33 selects the local signal (processing block 531). As previously described this can take place by substituting the next subliminal message in place of the remote video signal or mixing the subliminal message and the remote video signal. The particular mode is selected at blocks 519 and 520. The mixing mode is the default for subliminal messages.

Subroutine 500 next determines if the current time equals the subliminal message stop time (decision block 532). The subliminal message stop time equals the subliminal message start time plus the subliminal message stay time. This test repeats until satisfied. When satisfied, video mixer 33 returns to the remote video signal (processing block 533).

Subroutine 500 next sets the next subliminal message start time (processing block 534). This next subliminal message start time equals the current time plus the subliminal message space time. Then the next subliminal message is loaded into video memory 43 (processing block 535). Ordinarily the messages are loaded in a predetermined order. If the user selects a priority message, this message repeats during one cycle more often than the other messages. This can take place by repeating the priority message during its normal part of the cycle or by displaying it additional times during other parts of the cycle. This completes the process of one subliminal message display.

A similar process takes place for supraliminal messages, if selected. Subroutine 500 determines if the current time equals the supraliminal message start time (decision block 536). If this is not the case, then no subliminal message is presented. If this is the case, then video mixer 33 selects the local signal (processing block 537). This can take place by substitution or mixing as selected by the user at blocks 428 and 429 (FIG. 4B). The substitution mode is the default for supraliminal messages. Subroutine 500 next determines if the current time equals the supraliminal message stop time (decision block 538), this test repeated until satisfied. When satisfied, video mixer 33 returns to the remote video signal (processing block 539). Subroutine 500 next sets the next subliminal message start time (processing block 540) and loads the next supraliminal message (processing block 541). This completes the process of one supraliminal message display.

The user has the opportunity to exit the subliminal message mode (decision block 542). This option is preferably exercised by depression of one key of keyboard 47. If selected, the total subliminal therapy time is computed and stored (processing block 543). Message generator/controller 30 subtracts the current time provided by central processing unit clock 46 from the start time captured in processing block 529. This total time is stored in data random access memory 53. The total subliminal therapy time is useful in determining the amount of therapy and its effectiveness, particularly in a clinical setting. The subliminal mode is then exited via end block 544. This returns control to the original menu of program 400. Otherwise control returns to processing block 530 to repeat the loop.

Figure 6:
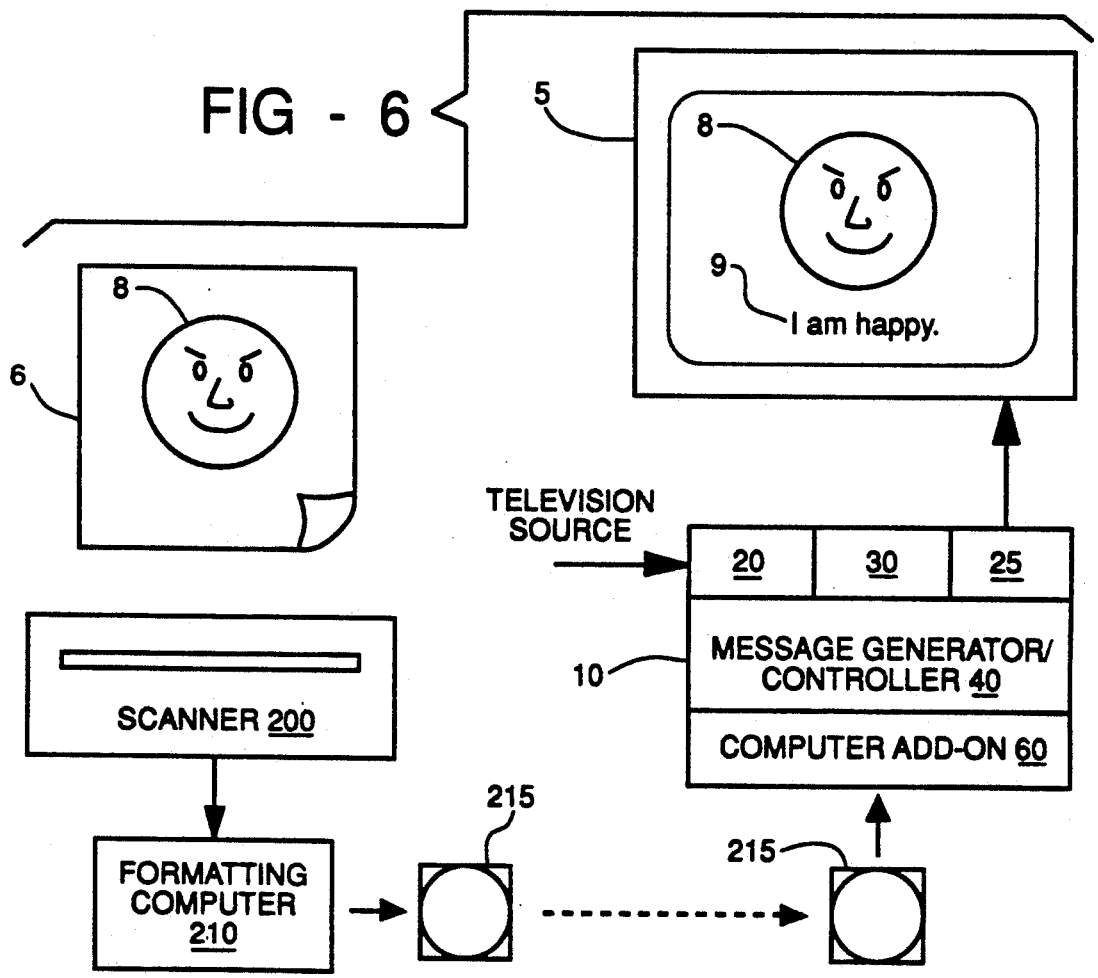
FIG. 6 illustrates in block diagram form an apparatus for introduction of a printed picture into a subliminal message.
Figure 7:
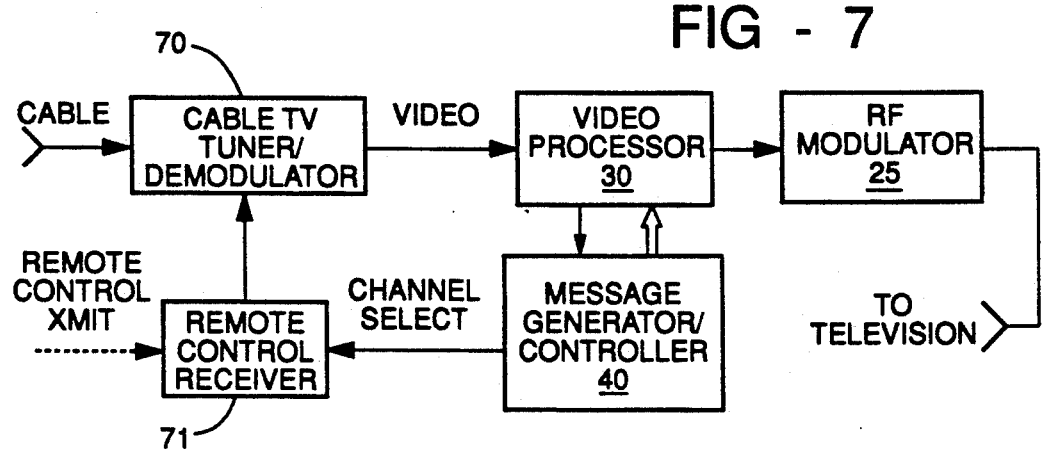
FIG. 7 illustrates in block diagram form a combined cable television converter and subliminal message generator in an alternative embodiment of this invention.
Figure 8:
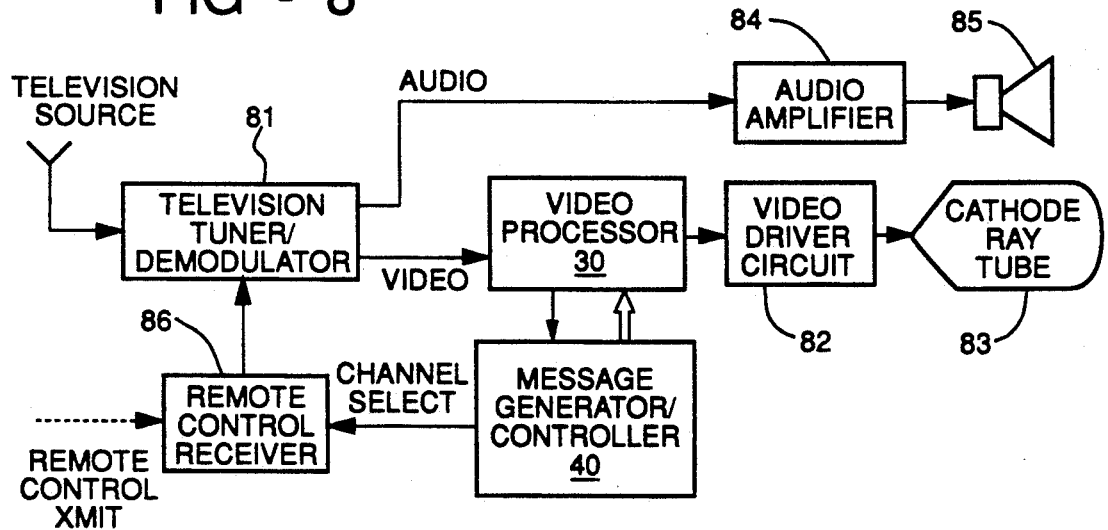
FIG. 8 illustrates in block diagram form a combined television receiver and subliminal message generator in with a further alternative embodiment of this invention.
Figure 9:
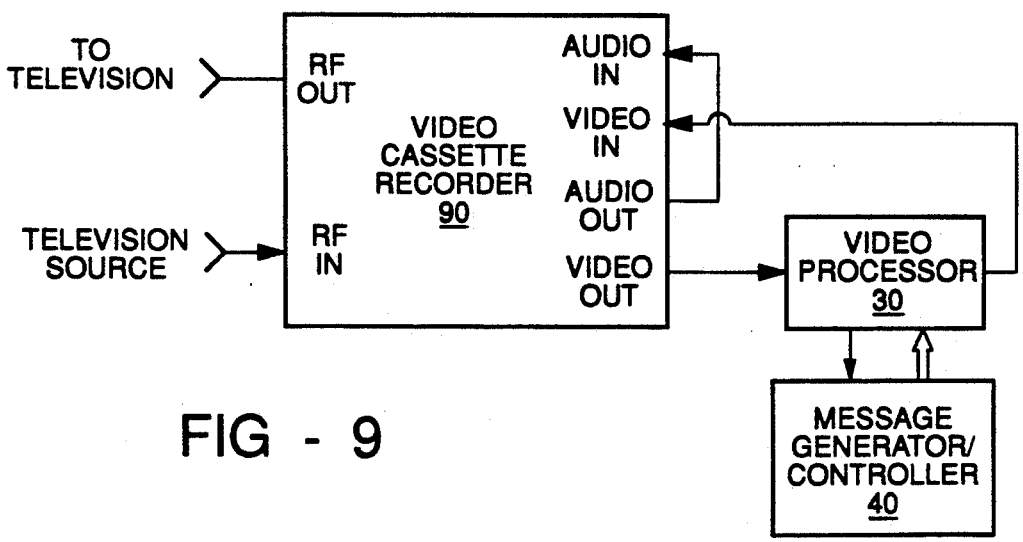
FIG. 9 illustrates in block diagram form the manner of use of this invention with a video cassette recorder.

FIGS. 6 to 9 illustrate alternative embodiments of the present invention. FIG. 6 illustrates a manner of introduction of a picture into subliminal message generator 10. FIG. 7 illustrates a combined cable conversion unit and subliminal message generator. FIG. 8 illustrates a combined television receiver and subliminal message generator. FIG. 9 illustrates a manner of elimination of the radio frequency tuner/decoder 20 and radio frequency modulator 25 using a video cassette recorder.

It may be desirable to permit the user to introduce custom pictures into subliminal message generator 10. Such custom pictures can be more complex than any pictures formed of graphic elements stored in read only memory 52. Picture 8, which the user desires to enter into subliminal message generator 10, may be a photograph of the user at a happier time, or in a more desirable state such as at a lighter weight. Scanner 200 optically scans sheet 6 producing a digital representation of picture 8. Formatting computer 210 converts this raw digital representation into a compressed image data format, which is written onto disk 215. Disk 215 is inserted into floppy disk drive 62 of computer add-on 60. Central processing unit 45 employs this compressed image data under control by the program within program read only memory 52 in construction of a subliminal message. Subliminal message generator 10 preferably permits the addition of text such as message 9 illustrated on the screen of television 5.

FIG. 7 illustrates a combined cable conversion unit and subliminal message generator. A cable conversion unit and subliminal message generator 10 include a number of similar parts, therefore such a combination advantageously reduces the components needed for both functions. The combined cable conversion unit and subliminal message generator includes cable television tuner/demodulator 70 receiving the cable television signal. Cable television tuner/demodulator 70 is similar to radio frequency tuner/demodulator 20 previously described. Cable television tuner/demodulator 70 tunes a selected cable channel under control of remote control receiver 71. Remote control receiver 81 is a conventional remote control receiver responsive to channel selection signals from a remote unit. Remote control receiver 71 may also receive a channel select signal from message generator/controller 40 corresponding to user inputs at keyboard 47. Cable television tuner/demodulator 70 may include a varactor voltage controlled tuner. Then remote control receiver 71 employs a digital to analog converter to produce an appropriate tuning voltage. Alternately, cable television tuner/demodulator 70 may be a digitally controlled phase locked loop tuner. Then remote control receiver 71 supplies digital data corresponding to the desired cable channel. Cable television tuner/demodulator 70 produces demodulated video signal in the manner of radio frequency tuner/demodulator 20. Other aspects of combined cable conversion unit and subliminal message generator are the same as illustrated in FIG. 1.

FIG. 8 illustrates a combined television receiver and subliminal message generator. This combination is advantageous because of the overlap of parts in these two devices. Television tuner/demodulator 81 is similar in construction to cable television tuner/demodulator 70, except that television tuner/demodulator 81 fully demodulates the audio signal. Television tuner/demodulator 81 receives television signals and tunes a particular channel selected by remote control receiver 86. Then television tuner/demodulator 81 need only tune the standard television broadcast channels. The audio output of television tuner/demodulator 81 drives audio amplifier 84. Audio amplifier 84 reproduces this audio signal via speaker 85. The video output of video processor 30 drives video driver circuit 82. Video driver circuit 82 produces the picture output on cathode ray tube 83. In other respects the combined television receiver and subliminal message generator is the same as illustrated in FIG. 1.

FIG. 9 illustrates a manner of practicing this invention using a video cassette recorder. Video cassette recorder 90 has a radio frequency input connected to a source of television signals. Video cassette recorder 90 includes a television tuner and demodulator and produces separate video and audio signals corresponding to the tuned television channel. These signals are used internally in the recording process and are available at external outputs. Video cassette recorder 90 includes a radio frequency modulator similar to radio frequency modulator 25. On playback, video cassette recorder 90 employs this internal radio frequency modulator to produce a television signal at a radio frequency output corresponding to the video and audio signals recalled from the cassette tape. This television signal is produced on either channel 3 or channel 4 as previously described. This television signal permits viewing of the recalled video and audio signals on a television receiver. Video cassette recorder 90 includes separate audio and video inputs to the radio frequency modulator.

Video processor 30 is connected to video cassette recorder 90 to take advantage of the television tuner and radio frequency modulator in video cassette recorder 90. The video output of video cassette recorder 90 supplies the input of video processor 30. Video processor 30 handles this video signal in the manner previously described. The output of video processor 30 supplies the video input of video cassette recorder 90. This is modulated on to a radio frequency signal by video cassette recorder 90 for viewing by an ordinary television receiver. The audio output of video cassette recorder 90 is coupled directly to its audio input because this signal in unchanged by the subliminal message generator.

This same technology can be used for subliminal therapy during computer use. Subliminal message generator 10 illustrated in FIG. 1 forms a fully functional computer. Substitution of a computer video generator for video processor 30 permits subliminal message generator 10 to be used for therapy during computer use. Program 400 and most of subroutine 500 may be operated once upon initialization of the subliminal mode. The subliminal messages would be generated using a memory resident program running at the same time as the primary application program. Memory resident programs operating on IBM PC/XT compatible computers are known in the art. The memory resident program would include blocks 530 to 542 of subroutine 500 illustrated in FIG. 5B. Upon detection of the time for presentation of a subliminal or supraliminal message, central processing unit 45 switches between display of the screen specified by the application program to the message specified by the processes of this invention. This may be accomplished by selection of display of differing sections of video memory 43. In other aspects the invention would operate in the manner previously described.

I claim:

1. A subliminal message generator for use with a video display device comprising:

a video synchronization detector having an input receiving a composite video signal for generating a synchronization clock signal in phase and time synchronism with said composite video signal;

a video display generator connected to said video synchronization detector for generating a video message signal corresponding to a received alphanumeric text message in phase and time synchronism with said synchronism clock signal;

a video mixer including a first input for receiving the composite video signal, a second input connected to said video display generator receiving said video message signal, an output for connection to the video display device and a selection input for selectively supplying either the composite video signal or said video message signal to said output corresponding to the signal on said selection input, said video mixer being operative to selectively supply said video message signal to said output by mixing said received composite video signal and said video message signal within the same interlace frame;
a user input device for receiving user commands;
a message memory storing therein a plurality of predetermined alphanumeric text messages including a plurality of predetermined positive affirmations intended for influence of a user's left brain and a plurality of predetermined positive affirmations intended for influence of a user's right brain;
a control apparatus connected to said video display generator, said video mixer and said user input device, said control apparatus operative to
receive user commands specifying at least one alphanumeric text message,
sequentially supply each of said at least one alphanumeric text message to said video display generator for generation of a corresponding video message signal,
select a subset of said plurality of predetermined alphanumeric text messages stored in said message memory corresponding to user commands for supply to said video display generator,
supply alternate positive affirmations intended for influencing of a user's left brain and positive affirmations intended for influencing of a user's right brain to said video display generator for generation of a corresponding video message signal, and
supply a selection signal to said selection input of said video mixer to supply said video message signal to said output for a subliminal period of time at periodic intervals and otherwise to supply the received composite video signal to said output.

2. A subliminal message generator for use with a video display device comprising:
a video synchronization detector having an input receiving a composite video signal for generating a synchronization clock signal in phase and time synchronism with said composite video signal;
a video display generator connected to said video synchronization detector for generating a video message signal corresponding to a received alphanumeric text message in phase and time synchronism with said synchronism clock signal;
a video mixer including a first input for receiving the composite video signal, a second input connected to said video display generator receiving said video message signal, an output for connection to the video display device and a selection input for selectively supplying either the composite video signal or said video message signal to said output corresponding to the signal on said selection input;
a user input device for receiving user commands;
a message memory connected to said control apparatus for storing therein a plurality of alphanumeric text messages specified by said user commands and a set of at least one default alphanumeric text message;
a control apparatus connected to said video display generator, said video mixer and said user input device said control apparatus operative to
receive user commands specifying at least one alphanumeric text message,
sequentially supply each of said at least one alphanumeric text message to said video display generator for generation of a corresponding video message signal each initial operation of said subliminal message generator upon failure to receive user commands specifying any other alphanumeric text message, and
supply a selection signal to said selection input of said video mixer to supply said video message signal to said output for a subliminal period of time at periodic intervals and otherwise to supply the received composite video signal to said output.

3. The subliminal message generator as claimed in claim 1, wherein:
said video display generator is controllable to generate a video message signal in a linear text mode or in a three dimensional perspective text mode; and
said control apparatus is further operative to
control said video display generator to generate a video message signal in said linear text mode upon supply of one of said positive affirmations directed to the left brain, and
control said video display generator to generate a video message signal in said three dimensional perspective text mode upon supply of one of said positive affirmations directed to the right brain.

4. The subliminal message generator as claimed in claim 3, wherein:
said video display generator further includes means for specifying a foreground color, a background color and a shadow color and is further operative to
generate said video message signal in said linear text mode corresponding to a received alphanumeric text message having a specified foreground color and a background color corresponding to a specified background color, and
generate said video message signal in said three dimensional perspective text mode text mode corresponding to a received alphanumeric text message having a specified foreground color, a specified background color and a specified shadow color; and
said control apparatus is further operative to
select a foreground color corresponding to user commands,
supply said selected foreground color to specify said foreground color of said video display generator,
select a background color signal corresponding to user commands,
supply said selected background color to specify said background color of said video display generator,
select a shadow color signal corresponding to user commands, and
supply said selected shadow color to specify said shadow color of said video display generator.

5. The subliminal message generator as claimed in claim 1, wherein:
'said plurality of predetermined alphanumeric text messages stored in said message memory include a plurality of sets of alphanumeric text messages, each set of alphanumeric text messages includes a plurality of predetermined positive affirmations directed to the left brain and a plurality of predetermined positive affirmations directed to the right brain relating to a predetermined topic; and
said control apparatus is further operative to
receive operator commands specifying one of said plurality of sets of alphanumeric text messages,
supply alternate positive affirmations directed to the left brain of said specified set of alphanumeric text messages and positive affirmations directed to the right brain of said specified set of alphanumeric text messages to said video display generator for generation of a corresponding video message signal.

6. A combined subliminal and supraliminal message generator comprising:

a video synchronization detector having an input receiving a composite video signal for generating a synchronization clock signal in phase and time synchronism with said composite video signal;

a video display generator connected to said video synchronization detector for generating a video message signal corresponding to a received alphanumeric text message in phase and time synchronism with said synchronism clock signal;

a video mixer including a first input for receiving the composite video signal, a second input connected to said video display generator receiving said video message signal, an output for connection to the video display device and a selection input for selectively supplying either the composite video signal or said video message signal to said output corresponding to the signal on said selection input;

a user input device for receiving user commands; and a control apparatus connected to said video display generator, said video mixer and said user input device, said control apparatus operative to select either a subliminal message mode or a bulletin mode corresponding to user commands, receive user commands specifying at least one alphanumeric text subliminal message, sequentially supply each of said at least one alphanumeric text subliminal message to said video display generator for generation of a corresponding video message signal when in said subliminal mode, supply a selection signal to said selection input of said video mixer to supply said video message signal to said output for a subliminal period of time at periodic intervals and otherwise to supply the received composite video signal to said output when in said subliminal mode, select a bulletin message corresponding to user commands, supply said bulletin message to said video display generator for generation of a corresponding video message signal when in said bulletin mode, and supply a selection signal to said selection input of said video mixer to supply said video message signal to said output until a user command acknowledges receipt of said bulletin message when in said bulletin mode.

7. A combined subliminal and supraliminal message generator comprising:

a video synchronization detector having an input receiving a composite video signal for generating a synchronization clock signal in phase and time synchronism with said composite video signal;

a video display generator connected to said video synchronization detector for generating a video message signal corresponding to a received alphanumeric text message in phase and time synchronism with said synchronism clock signal;

a video mixer including a first input for receiving the composite video signal, a second input connected to said video display generator receiving said video message signal, an output for connection to the video display device and a selection input for selectively supplying either the composite video signal or said video message signal to said output corresponding to the signal on said selection input;

a user input device for receiving user commands;

a real time clock circuit for generating a real time clock signal indicating the current time;

a control apparatus connected to said video display generator, said video mixer, said user input device and said real time clock, said control apparatus operative to select either a subliminal message mode or an alarm mode corresponding to user commands, receive user commands specifying at least one alphanumeric text subliminal message, sequentially supply each of said at least one alphanumeric text subliminal message to said video display generator for generation of a corresponding video message signal when in said subliminal mode, supply a selection signal to said selection input of said video mixer to supply said video message signal to said output for a subliminal period of time at periodic intervals and otherwise to supply the received composite video signal to said output when in said subliminal mode, select a predetermined future alarm time and an alarm message corresponding to user commands, supply said alarm message to said video display generator for generation of a corresponding video message signal when in said alarm mode and said real time signal indicates said alarm time, and supply a selection signal to said selection input of said video mixer to supply said video message signal to said output until a user command acknowledges receipt of said alarm message when in said alarm mode and said real time signal indicates said alarm time.

8. A combined subliminal and supraliminal message generator comprising:

a video synchronization detector having an input receiving a composite video signal for generating a synchronization clock signal in phase and time synchronism with said composite video signal;

a video display generator connected to said video synchronization detector for generating a video message signal corresponding to a received alphanumeric text message in phase and time synchronism with said synchronism clock signal;

a video mixer including a first input for receiving the composite video signal, a second input connected to said video display generator receiving said video message signal, an output for connection to the video display device and a selection input for selectively supplying either the composite video signal or said video message signal to said output corresponding to the signal on said selection input;

a user input device for receiving user commands;

a real time clock circuit for generating a real time clock signal indicating the current time;

a control apparatus connected to said video display generator, said video mixer, said user input device and said real time clock, said control apparatus operative to select either a subliminal message mode or a blocking mode corresponding to user commands, receive user commands specifying at least one alphanumeric text subliminal message, sequentially supply each of said at least one alphanumeric text subliminal message to said video display generator for generation of a corresponding video message signal when in said subliminal mode, supply a selection signal to said selection input of said video mixer to supply said video message signal to said output for a subliminal period of time at periodic intervals and otherwise to supply the received composite video signal to said output when in said subliminal mode, select a predetermined future block start time, a predetermined future block end time and a blocking message corresponding to user commands, supply said blocking message to said video display generator for generation of a corresponding video message signal when in said blocking mode and said real time signal indicates a time between said block start time and said block end time, and supply a selection signal to said selection input of said video mixer to supply said video message signal to said output interval when in said blocking mode and said real time signal indicates a time between said block start time and said block end time.

* * * * *